United States Patent [19]

Borzym

[11] 4,376,401
[45] Mar. 15, 1983

[54] BEVEL GEAR DRIVE WITH MEANS TO CONTROL BACKLASH FOR FLYING RAM CUTOFF MACHINE

[76] Inventor: John J. Borzym, 4820 Schoolbell, Birmingham, Mich. 48010

[21] Appl. No.: 213,295

[22] Filed: Dec. 5, 1980

[51] Int. Cl.³ .................... B23D 21/00; B23D 25/04
[52] U.S. Cl. ................................ 83/319; 83/320; 83/628; 74/409
[58] Field of Search ...................... 83/318–320, 83/327, 328, 37, 54, 628; 74/44, 409, 440; 100/282

[56] References Cited

U.S. PATENT DOCUMENTS

| | | | |
|---|---|---|---|
| 1,287,485 | 12/1918 | Smith | 83/318 |
| 3,111,054 | 11/1963 | Tisken | 83/320 |
| 3,273,433 | 9/1966 | Borzym | 83/54 |
| 3,288,011 | 11/1966 | Borzym | 83/310 |
| 3,288,012 | 11/1966 | Borzym | 83/310 |
| 3,538,606 | 11/1970 | Piatek et al. | 83/327 |
| 4,149,438 | 4/1979 | Hori | 83/319 |

*Primary Examiner*—James M. Meister
*Attorney, Agent, or Firm*—Krass, Young & Schivley

[57] ABSTRACT

A flying ram cutoff machine for severing successive lengths of an elongated workpiece continuously moving in the direction of its longitudinal axis employs a bevel gear drive for swinging a ram in synchronization with movement of the workpiece. A motor drive fly wheel and clutch assembly power a drive shaft which extends parallel to the longitudinal axis of the workpiece, at the rear of the machine. A pair of bevel gears disposed at spaced locations along the drive shaft form power take-offs for transmitting power from the drive shaft to a pair of input shafts which extend perpendicularly away from the drive shaft and toward the swingable ram. A pair of crank assemblies couple the input shafts with the ram to produce swinging movement of the ram upon rotation of the drive shaft. Backlash of the drive system is controlled by interposing a stabilizing spacer between one of the bevel gears and a stationary support. The drive system may be interchangeably employed with either horizontal or inclined type rams, and exceptionally long rams may be driven without the need for idler gears or the like.

12 Claims, 3 Drawing Figures

BEVEL GEAR DRIVE WITH MEANS TO CONTROL BACKLASH FOR FLYING RAM CUTOFF MACHINE

TECHNICAL FIELD

This invention generally relates to flying ram cutoff machines in which a swingable ram is driven in synchronization with the movement of a workpiece, and deals more particularly with a drive system for powering the ram which may be used with rams of either the horizontal or inclined type.

BACKGROUND ART

Flying ram cutoff machines, and drive systems therefor, are well known in the art. Machines of this type include a ram swingably mounted on a stationary bed and a die set reciprocably mounted on the bed. An accelerator reciprocates the die in synchronism with the workpiece and is cammed by the ram to selectively clamp the workpiece immediately prior to and during a cut. A drive system coupled with a source of power, such as an electric motor and flywheel, produces orbital swinging movement of the ram in synchronization with the movement of an elongate workpiece which continously travels through the die set.

It is generally desirable to orient the ram in a horizontal plane in connection with the severing of a workpiece having a circular cross section. Cutoff machines of this general type are disclosed in U.S. Pat. Nos. 3,288,011 and 3,288,012. As shown in the disclosures of both of these prior patents, a drive system for operating the horizontal ram includes a motor, flywheel, and clutch assembly mounted on the rear of the machine which power a drive shaft that extends perpendicular to the longitudinal axis of the workpiece. In those applications wherein high ram pressures must be developed to sever relatively thick workpieces, it is necessary to drive the ram at least at two locations using crank assemblies coupled to a pair of power take-offs from the main drive shaft. As shown in U.S. Pat. No. 3,288,012, the output of the main drive shaft is delivered through a pinion gear to a pair of crank gears which, in turn, rotate take-off shafts that drive the crank assemblies. Although this arrangement is perfectly satisfactory in terms of results, the crank gears are relatively massive and therefore not only displace a considerable amount of volume but are relatively expensive to produce. More importantly, however, in order to drive rams of extended length, it is necessary to either increase the pitch diameter of the pinion and crank gears, or various idler gears must be employed in order to transmit power from the drive shaft to the take-off shafts. These alternatives have the disadvantage of increasing the number of gear components which must be maintained in inventory and/or, increase the number of components, and therefore overall costs, of the machine. Additionally, the relatively massive crank gears substantially increase drive train inertia thereby making it more difficult (and most costly) to control synchronism of the ram.

In the case of workpieces having a square or otherwise angular cross section configuration, it is desirable to employ an inclined ram in order that the die set and associated severing blade may be likewise inclined at a desired attitude to improve the quality of cut. This necessitates specially configured drive train components. Consequently, alternate drive systems have been developed for powering inclined rams as exemplified by the machine disclosed in U.S. Pat. No. 3,272,433. As shown in this last-mentioned patent the motor, flywheel, brake and clutch are disposed at one end of the machine and power a drive shaft which extends essentially parallel to the longitudinal axis of the workpiece. Power take-off from the main drive shaft is accomplished through a series of spur gears and crank arms which are relatively complex in their arrangement. This type of drive system is incompatible with the requirements of a horizontal ram machine, consequently, the components of drive systems for the horizontal and inclined ram machines are not readily interchangeable.

A further shortcoming of prior art drive systems common to both the horizontal and inclined rams involves the phenomenon of backlash through the drive system created by cumulative manufacturing tolerances in the drive train gears. Backlash in prior art systems could be controlled only by altering the thicknesses of certain gear teeth of the drive gears. This approach to the problem is naturally time consuming and therefore costly from a labor as well as from a material standpoint. Excessive backlash in prior art drive systems sometimes results in a loss of operating synchronism between the crank assemblies thereby substantially increasing drive train wear and posing a substantial risk of component failure due to the excessive stresses.

Accordingly, it is an important object of the present invention to provide a drive system which not only reduces the number of drive train components but allows such components to be interchangeably employed in connection with rams of either the horizontal or inclined type.

A further important object of the present invention is to provide a drive system of the type mentioned above in which particularly long rams may be driven at substantially spaced locations without the need for altering pitch diameter of the drive gears or employing idler gears or the like. In connection with this object of the invention, the present drive system significantly reduces overall inertia in the drive train thereby reducing inertial stress on the clutch and brake of the system.

Another object of the present invention is to provide a drive system of the type mentioned above in which backlash through the drive train may be effectively and simply controlled.

A still further object of the present invention is to provide a drive system as mentioned above which employs a pair of bevel gears respectively connected to a drive shaft and a pair of take-off shafts at spaced locations along the drive shaft.

DISCLOSURE OF THE INVENTION

In accordance with the present invention, a flying ram cutoff machine for severing successive lengths of an elongate workpiece which continuously emanates from a source thereof, such as a mill, in the direction of its longitudinal axis, employs a bevel gear drive system for swinging the ram in synchronization with movement of the workpiece. A motor, flywheel, and clutch assembly disposed at one end of the machine powers a drive shaft which is mounted on a stationary head portion of the machine and extends parallel to the longitudinal axis of the workpiece. A pair of bevel gears mounted on the head portion at spaced locations along the drive shaft form power take-offs for transmitting power from the drive shaft to a pair of input shafts which extend perpendicularly away from the drive shaft and toward the ram. A pair of crank assemblies couple the input shafts with the ram to produce orbital swinging movement of the ram upon rotation of the drive shaft. Backlash of the drive train system is controlled by interposing a stabilizing spacer between one of the bevel gears and a stationary support. The drive system may be employed in connection with exceptionally long rams by merely increasing the distance between the take-off points, without the need for idler gears or alteration of pitch diameter of the drive gears. The drive system may be employed in connection either with horizontal or inclined type rams such that identical drive train components may be interchangeably used with horizontal or inclined type ram machines.

BRIEF DESCRIPTION OF THE DRAWINGS

In the drawings, which form an integral part of the specification and are to be read in conjunction therewith, and in which like components are designated by the same reference numerals in the various views.

BEST MODE FOR CARRYING OUT THE INVENTION

Figure 1:
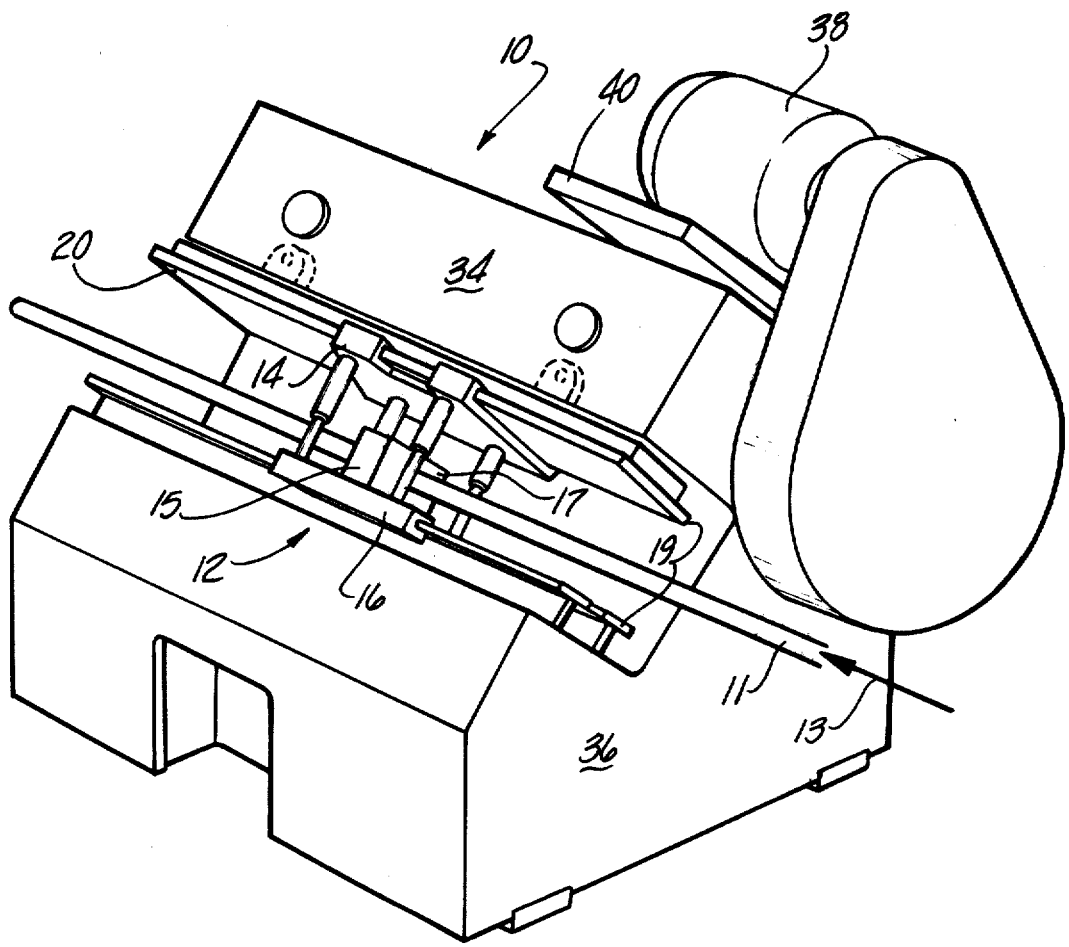
FIG. 1 is a front perspective view of a flying ram cutoff machine of the type having an inclined ram, and including a bevel gear drive therefor which forms the preferred embodiment of the present invention.
Figure 2:
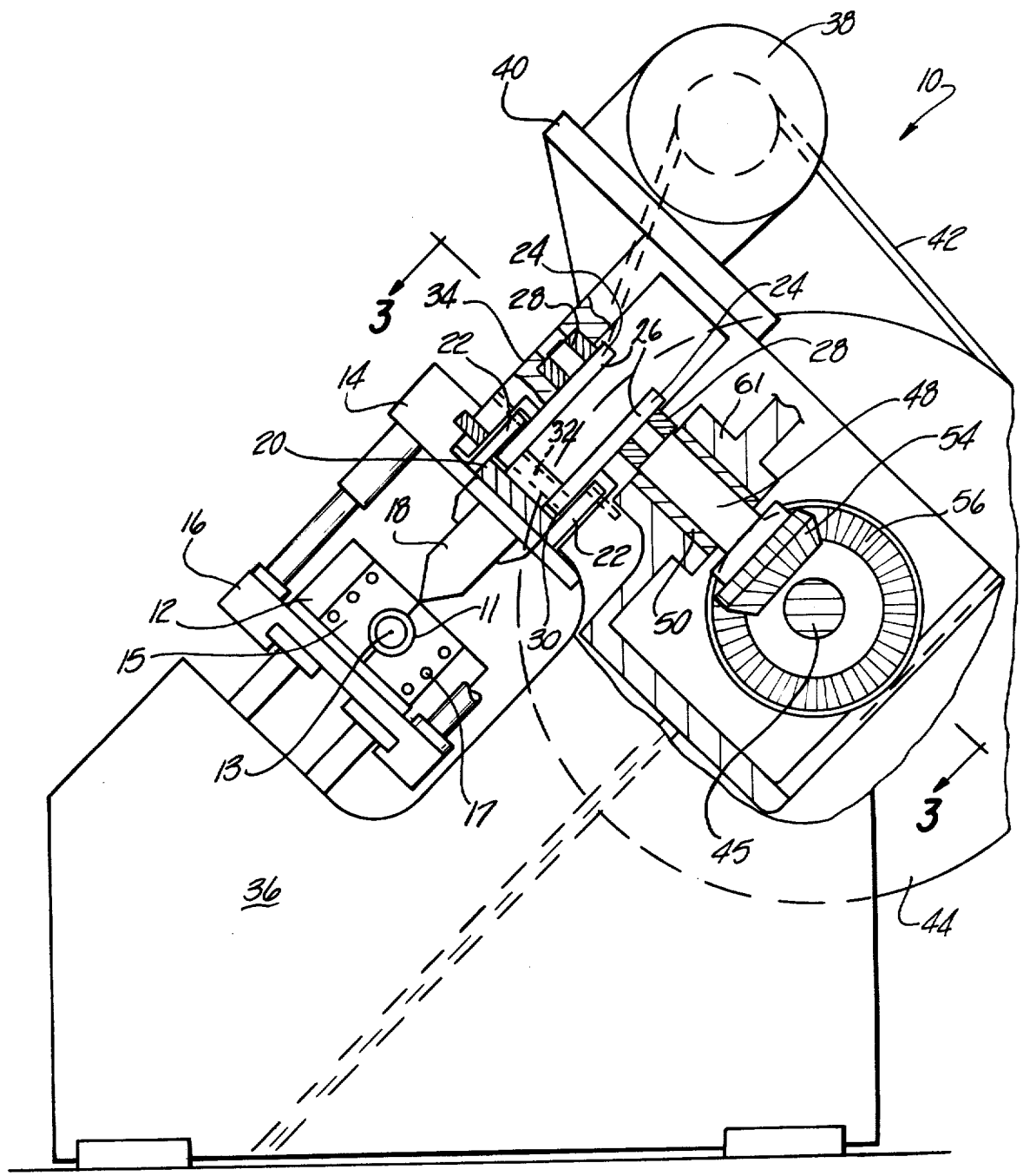
FIG. 2 is an end view of the machine shown in FIG. 1, parts being broken away in section for clarity.
Figure 3:
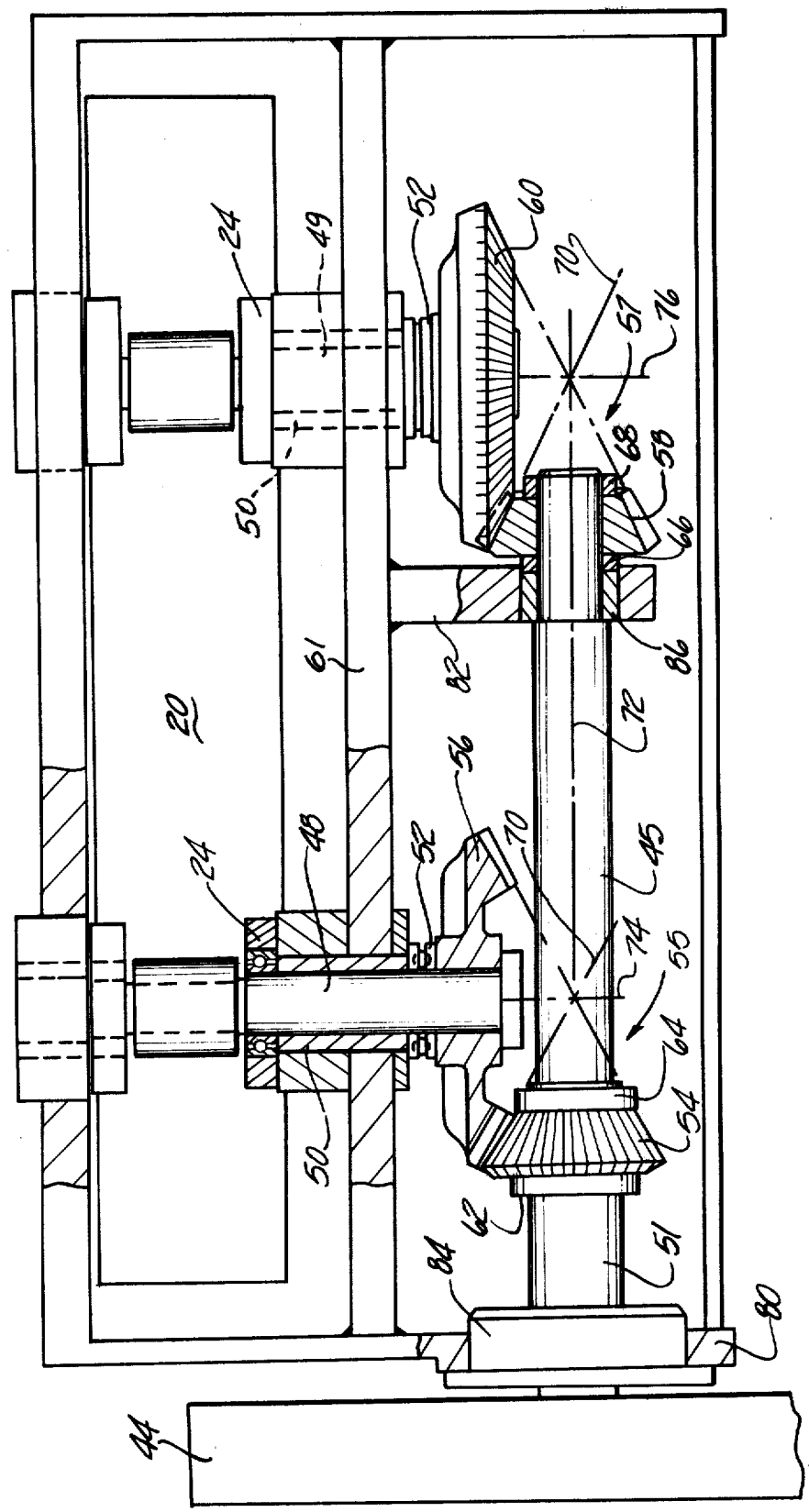
FIG. 3 is a sectional view taken along the line 3—3 of FIG. 2.

Referring now to the drawings, the present invention relates to a novel drive system for operating a flying cutoff machine generally indicated by the numeral 10 which is adapted to sever successive lengths of a workpiece 11 continuously emanating from a source thereof (not shown) such as a mill and traveling in the direction of its longitudinal axis 13 through the machine 10. The machine 10 includes a stationary bed 36 suitably mounted on a supporting surface and a head portion 34 disposed above the base 36 and spaced therefrom.

A die set 12 is disposed between the head portion 34 and base 36 and comprises an upper shoe 14 and lower shoe 16. Lower shoe 16 is mounted on the bed 36, while upper shoe 14 is secured to a ram 20, along with a severing blade 18. A series of links 22 pivotally support the ram 20 beneath the head portion 34 for orbital swinging movement in a direction parallel with the longitudinal axis 13 of the workpiece 11. A pair of crank assemblies 24 drivingly connect the ram 20 to a pair of later discussed, respectively associated input shafts 48 and 49. The die set 12 also includes a pair of opposed die jaws 15 and 17 reciprocably mounted on the lower die shoe 16. Lower die shoe 16 is mounted on ways 19 for sliding movement on the machine 10 in a direction parallel to the longitudinal axis 13.

The drive system for machine 10 includes a power source such as an electric motor 38 mounted on a bracket 40 secured to the head portion 34 of the machine 10, and a fly wheel 44 drivingly connected to the motor 38 by one or more drive belts 42. Motor 38 and fly wheel 44 are mounted on one end of the machine 10 and are drivingly intercoupled by one or more drive belts 42. Fly wheel 44, along with a combination brake and clutch assembly (not shown), are secured to one end of a drive shaft 45 whose longitudinal axis 72 extends in a direction parallel to the longitudinal axis 13 of workpiece 11. Drive shaft 45 is journalled for rotation in a pair of longitudinally spaced support bearings 84 and 86 respectively mounted in shaft supports 80 and 82 extending rearwardly from the head portion 34.

First and second gear means forming power take-offs from the drive shaft 45 are generally indicated at 55 and 57 and are respectively disposed at spaced apart locations along the drive shaft 45. First gear means 55 comprises a first bevel gear 54 mounted on the drive shaft 45 and a second bevel gear 56 mounted on one extremity of an input shaft 48. Bevel gears 54 and 56 form a mitre bevel arrangement wherein the mesh line 70 of the corresponding teeth extends obliquely to the longitudinal axes 72 and 74 of the drive shafts 45 and input shaft 48, respectively. Bevel gear 54 is secured to drive shaft 45 by a pair of mounting rings 62 and 64 disposed on opposite sides thereof which are secured fast to drive shaft 45. Spacing means in a nature of a tubular, cylindrical spacer 51 sleeved over the drive shaft 45 and fixedly secured thereto is interposed between the bearing 84 and mounting ring 62 in order to prevent substantial longitudinal movement of the drive shaft 45 as a result of drive train backlash.

Bevel gear 56 is secured to one end of input shaft 48 and may include a shear pin connection (not shown) between gear 56 and shaft 48 in order to prevent component damage in the case of drive train overload. Input shaft 48 is rotatably carried within a sleeve 50 which is secured to a vertically extending mounting plate 61 at the rear of the machine 10. A thrust bearing 52 is interposed between one end of the sleeve 50 and bevel gear 56.

Second gear means 57 comprises a first bevel gear 58 mounted on one extremity of drive shaft 45, and a second bevel gear 60 mounted on one extremity of input shaft 49. Bevel gear 58 is secured to drive shaft 45 by a pair of mounting rings 66 and 68 disposed on opposite sides thereof and made fast to drive shaft 45. Bevel gear 60, like bevel gear 56, may be connected by means of a shear pin (not shown) to the input shaft 49 in order to prevent component damage in the event of drive train overload. The mesh line 70 of the mutually engaging teeth of bevel gears 58 and 60 extends obliquely to axes 72 and 76 and forms a mitre bevel arrangement similar to the first set of gear means 55. Input shaft 49 is rotatably carried within a sleeve 50 secured to the mounting plate 61, while a thrust bearing 52 is interposed between the second bevel gear 60 and one extremity of the sleeve 50.

It is to be noted here that although the first and second gear means 55 and 57 are depicted as comprising mitre bevel gears, spiral bevel gears or even worm gears may also be alternately employed.

Input shafts 48 and 49 each extend perpendicularly away from drive shaft 45 toward the ram 20, and the respective longitudinal axes 74 and 76 are inclined from a horizontal reference plane at an angle of approximately 45°. Each of the input shafts 48 and 49 is connected to a pair of longitudinally spaced crank assemblies 24 which are rotatably carried by a pair of main bearings 28 mounted on the head portion 34. Each of the crank assemblies 24 includes a pair of crank throws 26 between which there is mounted a crank pin 32 for pivotally connecting the ram 20 with the crank assemblies 24.

In operation, engagement of the drive clutch (not shown) results in the motor 38 driving the fly wheel 44 which in turn rotates drive shaft 45. The rotational motion of drive shaft 45 is translated by the first and second gear means 55 and 57 to rotational motion of the input shafts 48 and 49. Input shafts 48 and 49 in turn rotate the crank assemblies 24 which translate such rotational motion to reciprocating motion thereby moving the ram 20 toward and away from the bed 36, while links 22 confine movement of the ram 20 to a swinging or orbital path aligned with the direction of the longitudinal axis 13 of the workpiece 11.

It is to be noted at this point that although the ram 20 is inclined approximately 45° with respect to the horizontal, the fly wheel 44 and clutch/brake assembly 46, as well as the drive shaft 45, remain in an essentially horizontal position, which facilitates access and maintenance thereof. It can be appreciated that the foregoing bevel gear drive systems may be employed in connection with similar cutoff machines wherein the ram 20 extends substantially horizontal since the only alteration necessary in such drive train would be the necessity of disposing the input shafts 48 and 49 horizontal, coplanar with drive shaft 45. This is possible since the use of bevel gears 54, 56, 58 and 60 allows intermeshing thereof at any point along their toothed periphery. Thus, any of the components described hereinabove including the drive shaft 45, gears 54, 54, 58 and 60, and input shafts 48 and 49, may be employed interchangeably in cutoff machines having horizontal or inclined type rams.

In contrast to prior art drive systems, the bevel gear drive of the present invention is readily adapted for use with exceptionally long rams since, in order to accommodate such rams, it is only necessary to separate the first and second gear means 55 and 57 by a correspondingly greater distance, thus eliminating the need for idler gears or the like.

Backlash created through the drive train is prevented from being transmitted back to the fly wheel 44 by virtue of the spacer 51 which substantially prevents longitudinal movement of the drive shaft 45. The degree of backlash control may be varied by simply altering the longitudinal dimension of the spacer 51.

From the foregoing, it is apparent that the bevel gear drive disclosed herein not only provides for the reliable accomplishment of the objects of the invention but does so in a particularly effective and economical manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

What is claimed is:

1. A cutoff machine for severing an elongated workpiece while the workpiece is moving in a path along its longitudinal axis, comprising:
    a stationary frame including a bed extending beneath and generally parallel to said path, said frame further including a head portion above said path and spaced from said bed;
    a ram above said bed and extending essentially parallel to said path;
    linkage means connecting said ram with said head portion for swinging movement about axes extending transverse to said path;
    drive means coupled with said ram for imparting swinging movement to said ram, said drive means including:
    (1) a pair of input shafts rotatably mounted on said head portion and extending transversely to said path,
    (2) means coupling said input shafts with said ram for translating rotational movement of each of said input shafts to motion,
    (3) a drive shaft rotatably mounted on said head portion and extending in a direction generally parallel to said path and between said pair of input shafts, said drive shaft being adapted to be coupled with a source of power for rotating said drive shaft;
    (4) first and second gear means located at spaced locations along said drive shaft for translating rotational motion of said drive shaft to said pair of input shafts;
    a pair of spaced apart supports on said head portion, each of said supports having said drive shaft journalled for rotation thereof; and
    spacer means extending between one of said first and second gear means and one of said supports for limiting the movement of said drive shaft along its longitudinal axis to a preselected magnitude thereof in order to control the amount of backlash in said drive means.

2. The cutoff machine of claim 1, wherein each of said first and second gear means comprises a first and second bevel gear meshingly coupled with each other and respectively mounted on said drive shaft and a corresponding input shaft.

3. The cutoff machine of claim 2, wherein the longitudinal axis of said drive shaft intersects the longitudinal axis of each of said pair of input shafts.

4. The cutoff machine of claim 3, wherein said first and second bevel gears each comprise a plurality of gear teeth meshingly engaging each other along a line extending oblique to the longitudinal axes of said drive shaft and said pair of input shafts.

5. The cutoff machine of claim 2, wherein said first and second bevel gears of each of said first and second gear means form a mitre bevel gear arrangement.

6. The cutoff machine of claim 1, wherein said ram extends in a plane inclined with respect to a horizontal reference plane.

7. The cutoff machine of claim 6, wherein:
    each of said first and second gear means comprises a first and second bevel gear drivingly engaging each other and respectively mounted on said drive shaft and a corresponding input shaft, and
    the longitudinal axis of said drive shaft extends in a horizontal direction.

8. The cutoff machine of claim 7, wherein the longitudinal axes of each of said input shafts are inclined from the horizontal approximately forty-five degrees.

9. The cutoff machine of claim 7, wherein said means for translating rotational movement of said input shafts to reciprocating motion comprises:
    a crankshaft rotatably mounted on said head portion and drivingly connected with said input shafts, and
    a connecting rod having the opposite ends thereof pivotally connected to said crankshaft and to said ram.

10. The cutoff machine of claim 1, wherein said spacer means comprises a sleeve member circumscribing a portion of the length of said drive shaft, the opposite ends of said sleeve member respectively engaging said one gear means and said one support.

11. A cutoff machine for operating on a moving workpiece on the fly, comprising:
a stationary frame;
a ram mounted on said frame for swinging movement toward and away from said workpiece;
a drive train for driving said ram to swing, including
 (1) a drive shaft rotatably mounted on said frame and adapted to be drivingly coupled with a motor, said drive shaft being slightly longitudinally shiftable, and
 (2) drive means coupled between said drive shaft and said ram for translating rotational movement of said drive shaft to swinging movement of said ram, said drive means including at least one take-off shaft and a pair of gears drivingly coupled with each other and respectively mounted on said drive shaft and said take-off shaft; and
means for controlling backlash in said drive train, including a spacer disposed between one of said pair of gears and said frame for limiting the movement of said drive shaft along its longitudinal axis to a preselected magnitude thereof.

12. The cutoff machine of claim 11 wherein said spacer includes a sleeve member circumscribing a portion of the length of said drive shaft.